United States Patent [19]

Brennan, Jr. et al.

[11] 3,710,913

[45] Jan. 16, 1973

[54] ELECTRONIC PRINTING INPUT-OUTPUT STATION

[75] Inventors: James Brennan, Jr.; Hermon L. Pope, Jr.; Donald F. Boren, all of Houston, Tex.

[73] Assignee: Texas Instruments Incorporated, Dallas, Tex.

[22] Filed: June 24, 1971

[21] Appl. No.: 156,514

Related U.S. Application Data

[62] Division of Ser. No. 788,226, Dec. 31, 1968, Pat. No. 3,638,197.

[52] U.S. Cl. ........................197/82, 101/93 C, 197/1, 197/133 R, 346/76

[51] Int. Cl. ..............................................B41j 19/00

[58] Field of Search...........197/82, 1, 133 R; 346/76; 101/93 C

[56] References Cited

UNITED STATES PATENTS

| | | | |
|---|---|---|---|
| 2,864,482 | 12/1958 | Augustin | 197/49 |
| 3,300,017 | 1/1967 | Yazejian et al. | 197/1 R |
| 3,308,917 | 3/1967 | Stabenau et al. | 197/48 |
| 3,374,873 | 3/1968 | Takenaka | 197/49 |
| 3,509,980 | 5/1970 | Loughry et al. | 197/1 R |
| 3,509,981 | 5/1970 | Hylan et al. | 197/82 |

*Primary Examiner*—Edgar S. Burr
*Attorney*—James T. Comfort

[57] ABSTRACT

An input-output station for a remote time shared computer is described which has a high speed electronic printer output and a keyboard encoder input. The output from the keyboard is temporarily stored in a one character buffer which serves as the input to the electronic printer and to an accumulator register comprised of parallel MOS shift registers where an entire line of characters are stored as they are printed. Only after the accumulator is full does the station respond to a poll character from the central processing unit to send the data through a parallel-to-serial converter and over the data link to the computer. The input to the computer is at the maximum rate at which the data can be transmitted, thus occupying the computer for only a fraction of the time otherwise required for the operator to enter the data direct from the keyboard. Data sent from the computer is routed through the converter to the buffer and is printed out by the high speed electronic printer at the maximum rate. This system provides for most efficient use of the computer by the input-output stations.

6 Claims, 14 Drawing Figures

ELECTRONIC PRINTING INPUT-OUTPUT STATION

This application is a division of application Ser. No. 788,226, filed Dec. 31, 1968, now U.S. Pat. No. 3,638,197, by James Brennan, Jr., et al., and assigned to the assignee of this invention.

This invention relates generally to input-output stations for time shared computers, and more particularly relates to such a device utilizing a high speed electronic printer.

Input-output terminals currently in use are relatively slow compared to computer operating speeds and data transmission rates. Slow input speed is the result primarily of the relatively slow rate at which an operator can encode the data by means of a conventional typewriter type keyboard. This is particularly disadvantageous when used in time sharing computer applications because the central processor is tied up for the entire period that an operator at one of the remote stations is inputting data to the processor by means of the keyboard. In addition, the input-output stations presently in use have been relatively slow in printing out, relatively expensive, relatively bulky, and quite noisy.

This invention is concerned with an input-output station which utilizes an MOS shift register storage means for accumulating a predetermined number of characters prior to responding to polling from the central processing unit of a time sharing system. The output from the accumulator is then transmitted to the central processing unit in response to polling at the maximum rate the data transmission link allows. The station utilizes an electronic printer which provides the capability of directly printing out data from the central processing unit at the maximum data transmission rate. In addition, the electronic printer is silent in operation, is more reliable, is smaller in size, lower in weight than previously available stations, and provides for an auxiliary input and auxiliary output device.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

DESCRIPTION OF FIG. 1 LOGIC

Figure 1:
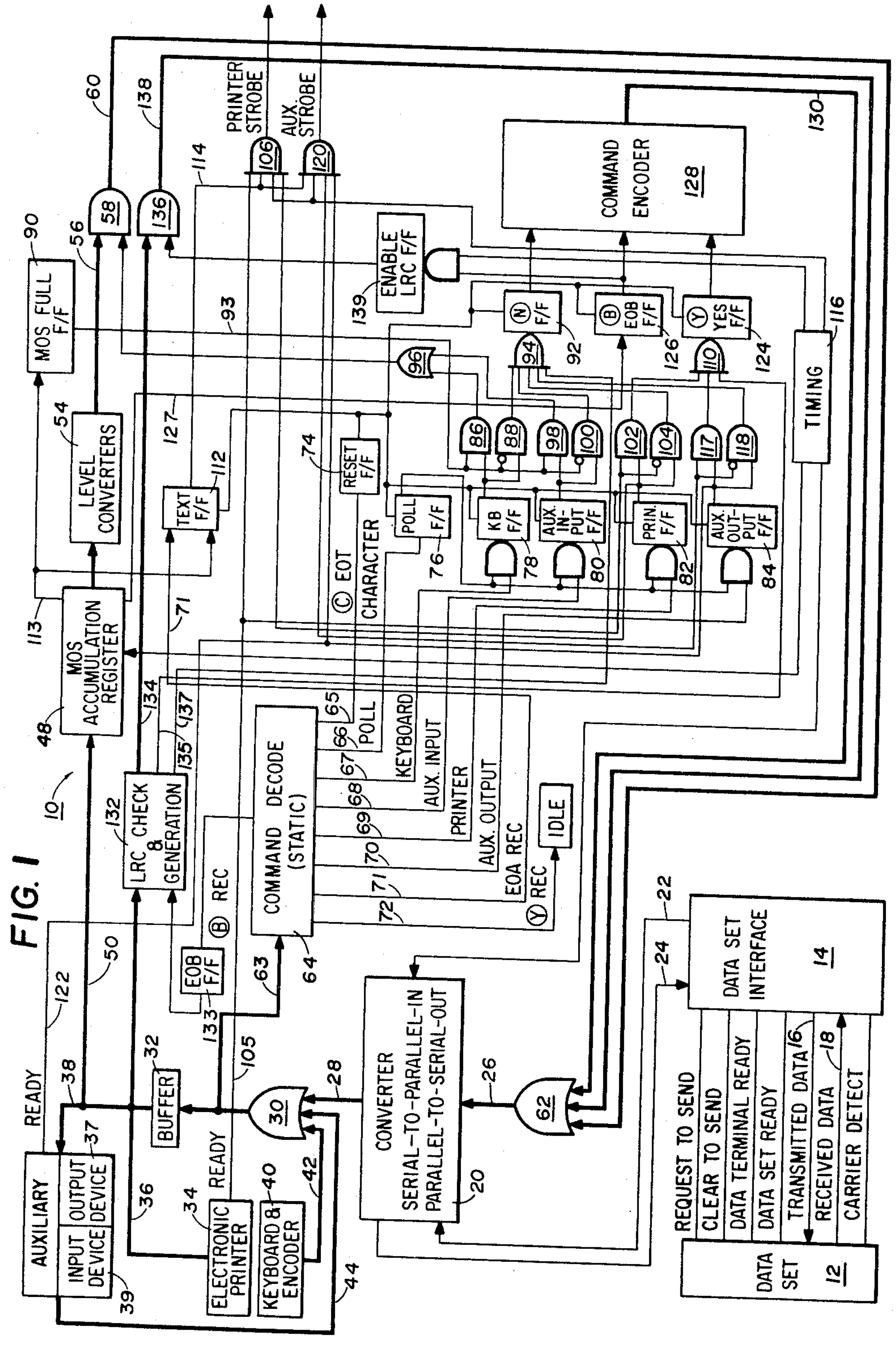
FIG. 1 is a schematic logic diagram of an input-output station in accordance with the present invention.

Referring now to the drawings, an input-output station in accordance with the present invention is indicated generally by the reference numeral 10 in the schematic logic diagram of FIG. 1. The input-output station 10 is adapted to operate with a conventional data set 12 used to transmit serial-by-bit data by existing telephone data link. For example, the data set may be a Bell Telephone System type 103F2 and may be linked by telephone line with an IBM 360 Model 30 computer utilizing an IBM 2702 transmission control unit. Utilizing such a system, a rate of fifteen characters per second can be achieved, the limiting factor being the telephone line data link.

The system 10 includes a data set interface 14 which is adapted to convert serial-by-bit character codes to the necessary logic levels of "request to send," "clear to send," "data terminal ready," "data set ready," and carrier detect in the conventional manner. In addition, serial-by-bit data is transmitted from interface 14 over line 16, and the same type of data is received over line 18. The serial-by-bit data is transmitted from the interface 14 to a converter 20 by way of line 22, and serial-by-bit data is received from the converter 20 by way of line 24.

The converter 20 is a shift register having parallel data inputs on channel 26 and parallel data outputs on channel 28 in addition to the serial input 22 and serial output 24. The converter thus performs serial-to-parallel conversion of data received from the data set interface 14, and performs parallel-to-serial conversion of data output to the data set interface 14.

The parallel-by-bit data from the converter 20 is passed through a selectively enabled switching network represented by OR gate 30 to a single character buffer 32. The parallel data in buffer 32 is continuously available to an electronic printer 34, which will hereafter be described in detail, by way of channel 36, and to an auxiliary output device 37 of any desired type by way of channel 38. The electronic printer 34 has the capability of printing character data at the maximum transmission rate.

The parallel-by-bit data produced by a conventional keyboard and encoder device 40 and the data encoded by the auxiliary input device 39 may be selectively, in the alternative, passed through gate 30 by way of channels 42 and 44, respectively, and stored in buffer 32. This data is printed out by the electronic printer 34 as it is encoded to permit the operator of the keyboard to read what is being encoded. The character in the buffer 32 is also stored in an accumulator register 48 by way of channel 50. The accumulator register 48 is comprised of a number of shift registers equal to the number of parallel bits contained in the data, each MOS shift register having a number of bits corresponding to a complete line of data produced by the electronic printer 34. For example, if the electronic printer 34 is capable of printing a 50 character line, the shift registers of the accumulator of 48 would include at least 50 bits plus end of address and new line code characters at the beginning and end of the block of data. The output from the accumulator register 48 is passed through level converters 54 and gated out by way of channel 56, gate 58, channel 60, and gate 62 to the converter 20 at the appropriate time as will hereafter be described.

All data passing through gate 30, whether from the converter 20, keyboard encoder 40, or output of the auxiliary device 37, is continually applied to a static command decode circuit 64 by way of channel 63. The command decode circuit 64 produces eight logic signals on lines 65–72 which are indicative, respectively, of the end of transmission (EOT), poll character for station (POLL), keyboard address, auxiliary input address, electronic printer address, auxiliary output address, end of address (EOA) received, and "yes" received.

When an end of transmission signal EOT is received, a reset flip-flop 74 is set, which in turn resets the entire system. When the station poll character is received, the poll flip-flop 76 is set which in turn enables the keyboard flip-flop 78, the auxiliary input flip-flop 80, the printer flip-flop 82, and the auxiliary output flip-flop 84. Then when a keyboard address, an auxiliary input address, a printer address, or an auxiliary output address is decoded, the respective flip-flops are set.

When the keyboard flip-flop 78 is set, gates 86 and 88 are enabled. If the MOS accumulator register 48 is full, as detected by the MOS full detector 90, gate 86 enables gate 58 through OR gate 96 so that data stored in register 48 is gated out. If the MOS storage 48 is not full, gate 88 produces an output which triggers the "-No" flip-flop 92 through OR gate 94. Then when the MOS accumulator 48 is filled, the output from gate 88 ceases, the "No" flip-flop 92 is reset, and the data from the MOS accumulation register 48 is gated out as a result of the signal through gates 86, 96, and 58. The same procedure is followed when the auxiliary input rather than the keyboard is addressed by the computer as the result of the operation of AND gates 98 and 100. Thus, the input from either the keyboard or the auxiliary device is selected by the central processing unit of the computer.

When the printer is addressed, the printer flip-flop 82 is set, thus enabling gates 102, 104 and 106. Then if the electronic printer 34 is not ready, as indicated by a low state on line 105, gate 104 sets "No" flip-flop 92 through gate 94. When the electronic printer is ready, gate 102 sets "Yes" flip-flop 124 through OR gate 110 and gate 106 is enabled by line 114 if the text flip-flop 112 is high as a result of receiving an end of address record over channel 71. This gates out a print strobe when a timing pulse is applied to gate 106 by the timing circuit 116.

When the auxiliary output device is addressed on line 70, the auxiliary output flip-flop 84 is set, thus enabling gates 117, 118 and 120. These three gates then function in the same manner as gates 102, 104 and 106, dependent upon the status of the ready line 122 from the auxiliary device 37, and line 114 from the text flip-flop 112.

A "Yes" flip-flip 124 is set whenever the printer is addressed and ready, whenever the auxiliary output is addressed and ready, or whenever a longitudinal redundancy check is satisfactory as will presently be described. An end of block flip-flop 126 is set by line 127 whenever a line shift is detected in the last storage space of the accumulation register 48. A command encoder 128 produces an appropriate character whenever the flip-flops 124 and 126 are set and this character is transferred by channel 130 through gate 62 and channel 26 to the converter 20.

The content of the buffer 32 is also continually applied to a longitudinal redundancy check (LRC) circuit 132. The circuit 132 performs a conventioanl longitudinal redundancy check on all incoming data received from the central processing unit and then compares the locally generated LRC number with the LRC number received from the central processing unit immediately following the receipt of an end of block decode signal from the command decode 64 which sets end of block (EOB) flip-flop 133. In addition, the LRC circuit 132 generates an LRC number for all outgoing data. The LRC number is transmitted by way of channel 134, gate 136, channel 138 and gate 62 after an end of block character (EOB) has been sent from encoder 128. This results from the detection of a line shift character in the last storage space of the accumulation register 48 and the setting of EOB flip-flop 126 by line 127, to in turn set the enable LRC flip-flop 139 and gate out the LRC number through gate 136.

OPERATION OF FIG. 1 LOGIC

In operation, assume that data is to be transmitted to the central processing unit. The operator of the keyboard 40 first presses the clear button which resets all flip-flops and puts an end of address (EOA) code in the first character of the MOS accumulation register 48. The operator then proceeds to enter data from the keyboard into the accumulation register 48 by way of gate 30 and buffer 32. When the operator has either filled the line, or entered all of the data, the return carriage button is pushed which generates a new line code which is also entered in the accumulation register 48.

As soon as the new line character is received by the first-in storage space of the accumulation register, all characters are stepped through the register until the end of address (EOA) character is detected at the first-out storage space, indicating that the MOS register is full. This resets the text flip-flop 112 by way of channel 113 to disable print strobes through gate 106, and sets the MOS full flip-flop 90 to enable gates 86 and 98 by way of line 93. Then when the central processing unit polls the station, poll flip-flop 76 is set, thus enabling flip-flops 78, 80, 82 and 84. Then when the keyboard is polled, keyboard flip-flop 78 is set, thus enabling gate 58 through gate 96. Data is then sent from accumulation register 48 to the computer over channel 60, gate 62 and converter 20 at the maximum rate permitted by the data link, the rate being clocked by the timing circuit 116.

When the new line character is detected in the first-out storage space of the accumulator register 48, the end of block flip-flop 126 is set by line 127 so that an end of block character is transmitted on channel 130 following the new line character. The output from the end of block flip-flop 126 also sets the enable LRC flip-flop 139 which in turn enables gate 136 so that the LRC number is transmitted following the end of block character. After the central processing unit has performed the longitudinal redundancy check, a "yes" is transmitted by the central processing unit. When the "yes" code is decoded by the command decode 64, the station 10 goes into the idle state.

If an end of address EOA character is received from the computer, text flip-flop 112 is set by line 71, thus enabling either gate 106 or 120. The central processing unit may then send data which will be printed out without further addressing the station or electronic printer.

Any time that data is to be transmitted by the computer to station 10, the station is polled to set POLL flip-flop 76 and either the electronic printer 34 is addressed to set flip-flop 82, or the auxiliary output device 37 is addressed to set flip-flop 84. Then when an end of address signal is transmitted, text flip-flop 112 is set by channel 71 to enable gate 106 or 120. If the printer is addressed and is ready, the output of gate 102 sets the "Yes" flip-flop 124 and a "yes" is transmitted to the computer indicating that the printer is ready. If the auxiliary output device is addressed and is ready, then a "yes" is transmitted to the computer. The data is then printed out by the addressed output device at the rate received from the computer. When the end of block (EOB) character is received from the computer, the end of block flip-flop 133 is set, thus enabling the longitudinal redundancy check circuit 132. The next character from the computer is the longitudinal redundancy check number which is compared with the longitudinal redundancy check number generated locally during receipt of the last data block. If the LRC numbers agree, "Yes" flip-flop 124 is set by channel 135 and a "yes" is transmitted to the computer. If the LRC numbers do not agree, the "No" flip-flop 92 is set by line 137 and a "no" transmitted to the computer. If a "yes" is transmitted to the computer, additional data may be sent by preceding the data with an end of address (EOA) character. If an end of transmission character (EOT) is sent instead, the reset flip-flop 74 is set through line 65 and the entire station 10 is cleared.

DESCRIPTION OF FIGS. 2–8

Figure 2:
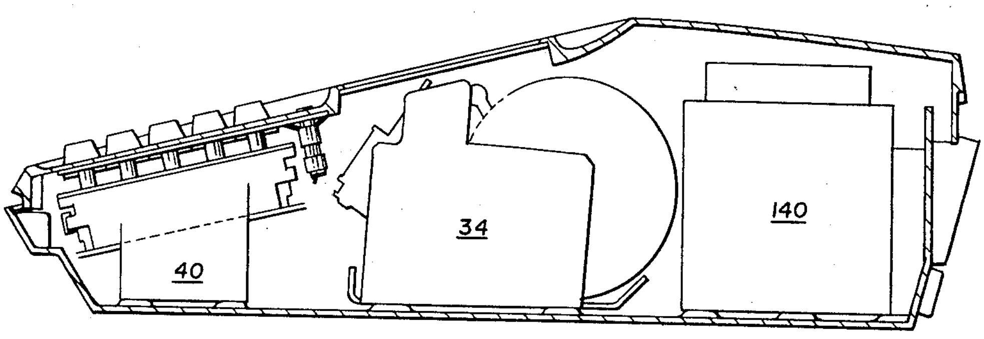
FIG. 2 is a simplified sectional view of an input-output station in accordance with the present invention.
Figure 3:
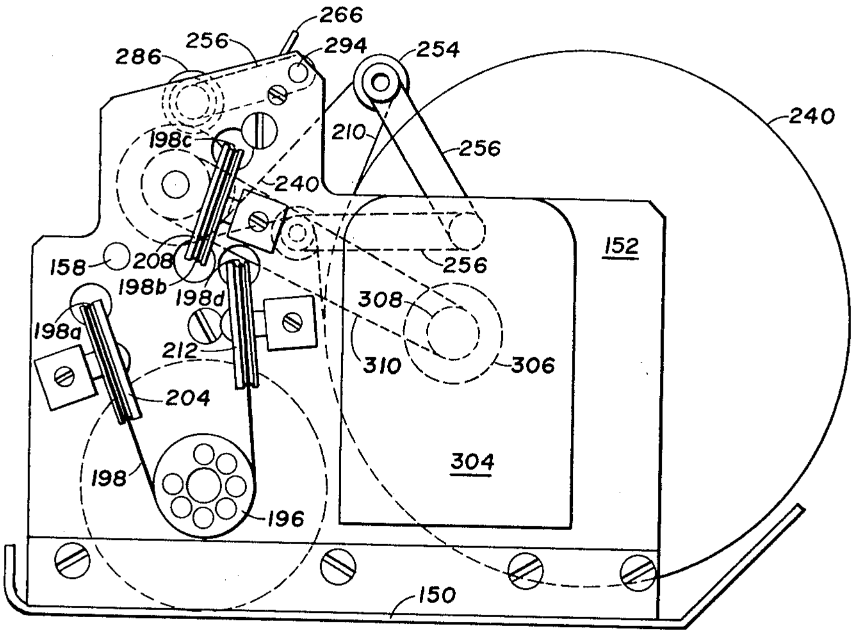
FIG. 3 is an end view of the electronic printer of the input-output terminal of FIG. 2.

The input-output station 10 is shown in the simplified longitudinal sectional view of FIG. 2 and is comprised of a keyboard and encoder section 40, an electronic printer 34, and an electronic circuitry package 140 which includes all of the circuitry of FIGS. 1, 9, 10 and 14. As previously mentioned, the keyboard and encoder 40 is of conventional design and includes the electronics necessary to produce the seven parallel bit binary code representative of the characters on the conventional typewriter keyboard, together with the necessary control codes. The mechanical aspects of the electronic printer 34 are shown in the detailed views of FIGS. 3–8. The electronic circuitry is illustrated in FIGS. 9–14.

Referring now to FIGS. 3–8, the electronic printer 34 has a support comprised of a base plate 150 to which are attached right-hand and left-hand end plates 152 and 154, respectively. As can best be seen in FIGS. 4 and 8, a carriage indicated generally by the reference numeral 156 is slidably mounted on a pair of cylindrical rods 158 and 160. The upper rod 158 is pivotally journaled in the end plates 152 and 154. The lower rod 160 is connected to the upper rod 158 by right- and left-hand arms 162 and 164. The left-hand arm 164 has a bell crank portion 166 which is connected by a spring 168 to the base plate 150.

Figure 8:
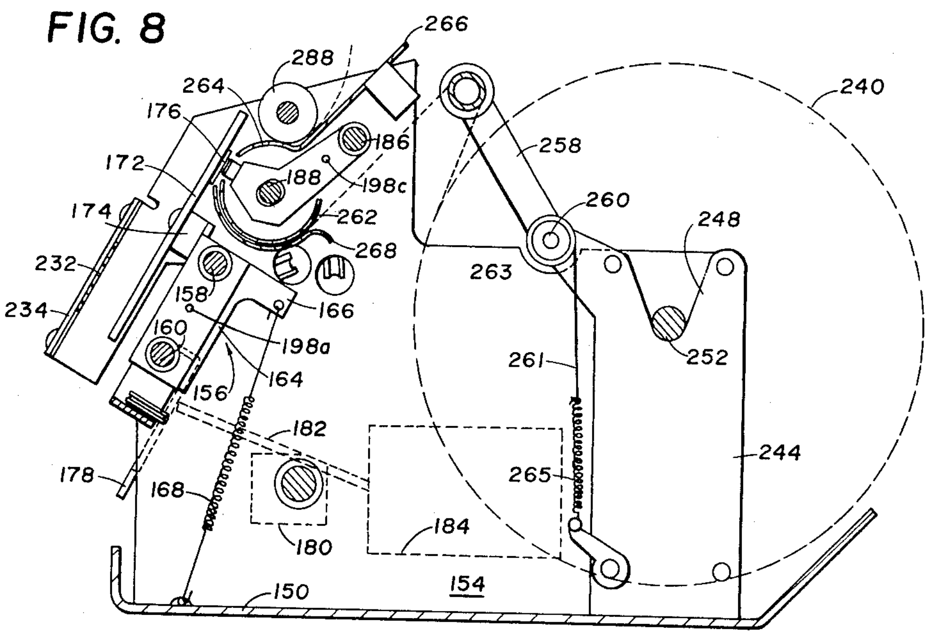
FIG. 8 is a transverse sectional view of the electronic printer of FIG. 3 looking toward the left-hand end of the device with a carriage at the left-hand margin.

The carriage 156 includes a channel portion 170 which has apertures in the flange portions receiving the rods 158 and 160, and a heat sink 172 which is connected to the channel 170 by a pair of standoffs 174 (see FIG. 8). An electronically controlled thermal printing matrix 176, which will hereafter be described in greater detail, is bonded to the interior face of the heat sink 172. An extension 160*a* of the rod 160 extends to the left of the arm 164. A metal tab 178 is connected to the end of the extension 160*a*. A magnet 180 is mounted on the left-hand face of the left-hand upright support plate 154 in position to hold the tab 178 when the lower rod 160 is pivoted inwardly. The rod 160 is also connected to the piston rod 182 of the dash pot 184 which is also mounted on the left-hand face of the left-hand upright support plate 154. When the tab 178 is pushed inwardly against the magnet 180, the upper end of the heat sink 172 and thus the printhead 176 is pivoted outwardly and held so as to permit loading of the paper as will presently be described. The dash pot 184 prevents the spring 168 from damaging the printhead 176 as it is returned by physically breaking the hold of the magnet 180.

A third rod 186 and a paper advance drive shaft 188 (see FIG. 8) extend between the upright support plates 152 and 154 and form a track upon which a pressure pad carriage 190 is slidably mounted. The pressure pad carriage supports a pressure pad 192 which is substantially the same size as the printing matrix of the printheat 176 in mating contact with the printing matrix. The pressure pad 192 includes a thin hard metal plate connected to the pressure pad carriage 190 by a resilient block. The hard metal plate provides an abrasive resistant surface, while the resilient block provides self-alignment to assure uniform contact over the face of the flat matrix.

Both the printhead carriage 156 and the pressure pad carriage 190 are moved from left to right across the respective tracks 158–160 and 186–188 by a carriage stepping motor 194 and cable system. The cable system includes a drum 196 mounted directly on the shaft of the stepping motor 194. The opposite ends of a cable 198 are secured in grooves 200 and 202 in drum 196 to form an endless loop. A length of the cable 198 greater than the distance of travel of the carriage 156 is wound around drum 196 at each end. As illustrated in the schematic diagram of FIG. 5, the cable 198 extends around a pulley 204 journaled on the right-hand upright 152 to a second pulley 206 mounted on the left-hand upright 154 to form a first reach 198*a*. The cable continues around pulley 208 journaled on the right-hand upright 152, pulley 210 journaled on the left-hand upright 154, and back around pulley 212 mounted on the right-hand upright 152 to form reaches 198*b*, 198*c* and 198*d*. The cable 198 is wound on the drum 196 in such a manner as to unwind and pass around pulley 204 as it is wound onto the drum from around pulley 212 at the same point on the drum. The printhead carriage 156 is connected to reach 198*a*, and the pressure pad carriage 190 is connected to reach 198*c* so that the two carriages are always moved in the same direction and in synchronism by the cable system.

An electrical cable takeup carriage 214 is comprised of a U-shaped plate having a base portion 216 extending parallel to the rod 160 and right-hand and left-hand arm portions 218 and 220 having sliding bearings 222 which ride on the print carriage rods 158 and 160. A pair of pulleys 224 and 226 are journaled on the base portion 216. A second cable 228 (see FIG. 5) extends from the right-hand upright 152 around the left-hand pulley 226, back around the right-hand pulley 224 and then is anchored at the left-hand upright 154. The cable 228 is not shown in FIG. 4 or 6 to simplify the drawings. A spool 230 is also journaled on the takeup carriage 214 and a flat multiple wire electrical cable 232 extends from an anchor bracket 234 on the left-hand upright 154 around the spool 230 to the carriage 156. As the carriage 156 moves between the left-hand position 156*a* shown in dotted outline in FIG. 5 and the right-hand position shown in solid outline, the spool 230 is moved one-half the distance as represented by the dotted position 230*a* as a result of the cable 228, thus keeping a slack out of the multilead electrical cable 232.

A helical spring 236 is fixed to the left-hand end of the shaft of the stepping motor 194 and to the left-hand upright 154 by the bracket 238. The spring 236 preloads the shaft of the stepping motor 194 with sufficient torque to maintain the carriage 156 at its full left-hand position when the windings of motor 194 are open-circuited, and the torque of the spring is increased as the motor 194 steps the carriage from left to right. However, since the spring 236 has a substantial length, the torque loading on the motor shaft is not significantly increased from a percentage standpoint, particularly since the shaft rotates only about three and one-half revolutions. When the windings of the stepping motor 194 are open-circuited, the torque of spring 236 drives the drum 196 in a direction to very rapidly move the printhead carriage 156 and the pressure pad carriage 190 to the left-hand margin position.

A system for supporting and feeding thermally sensitive paper 240 from a large roll is comprised of a right-hand support 242 which is connected to the right-hand upright by standoffs 243 and a left-hand support 244 which is connected to the left-hand upright 154. The supports 242 and 244 have identical V-shaped grooves 246 and 248 at the upper end for receiving the stub axles 250 and 252 projecting from the support for the roll of paper. The sheet of paper 240 proceeds upwardly from the periphery of the roll around a buffer roller 254 which is journaled on arms 256 and 258, see FIG. 6, which in turn are journaled on the supports 242 and 244, respectively, at pivot points lying on axis 260. The arms 256 and 258 are biased upwardly by the straps 261 wound around drums 263 and urged downwardly by springs 265. The arms pivot against the force of the spring between the upper position shown in solid outline in FIG. 3 and the position shown in dotted outline. The paper 240 then proceeds around a fixed, cylindrical, lower shelf 262, up between the printhead 176 and the pressure pad 192, and over a fixed, cylindrical, upper shelf 264 which terminates in an upwardly extending flange portion 266. A guide trough 268 is disposed beneath the lower shelf 262 to assist in causing the paper to pass upwardly in front of the lower shelf 262.

Figure 4:
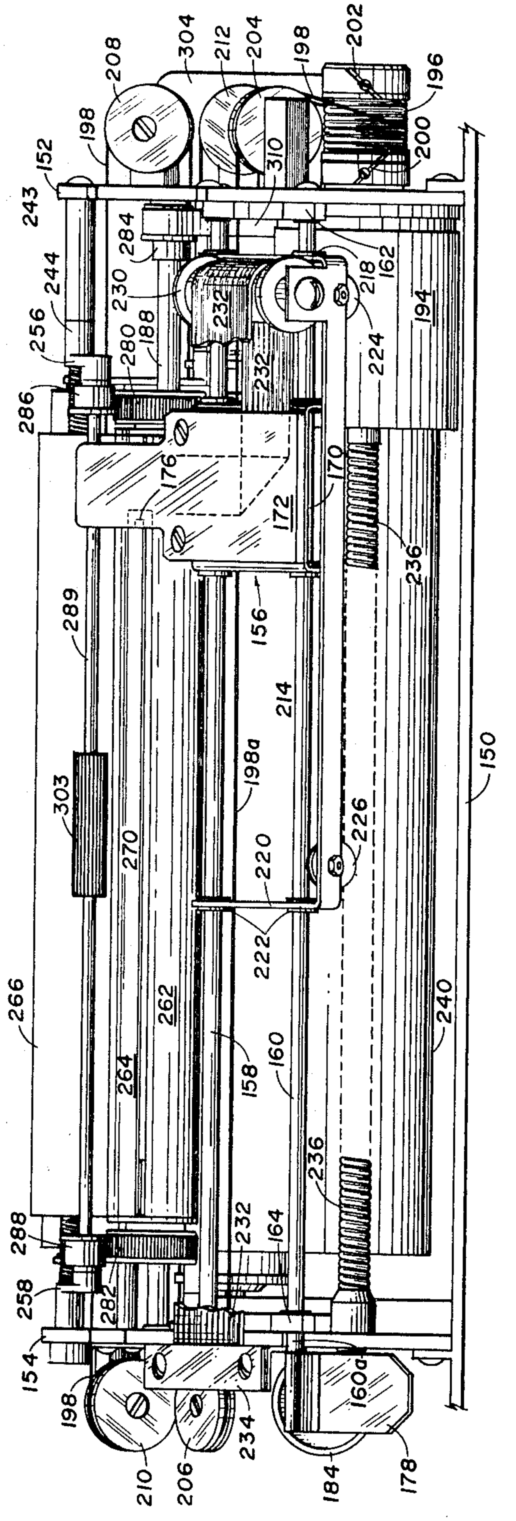
FIG. 4 is a front elevational view of the electronic printer of FIG. 3.
Figure 5:
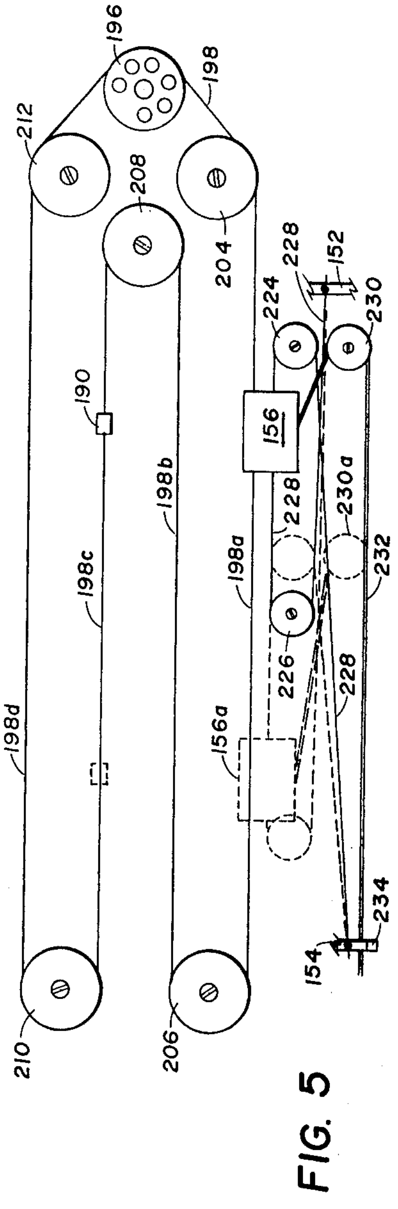
FIG. 5 is a schematic diagram illustrating the cable system of the electronic printer of FIG. 3.
Figure 7:
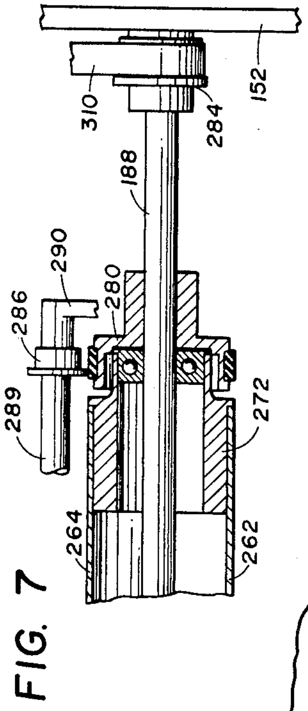
FIG. 7 is a partial vertical sectional view of a portion of the paper advance mechanism of the electronic printer of FIG. 3.
Figure 6:
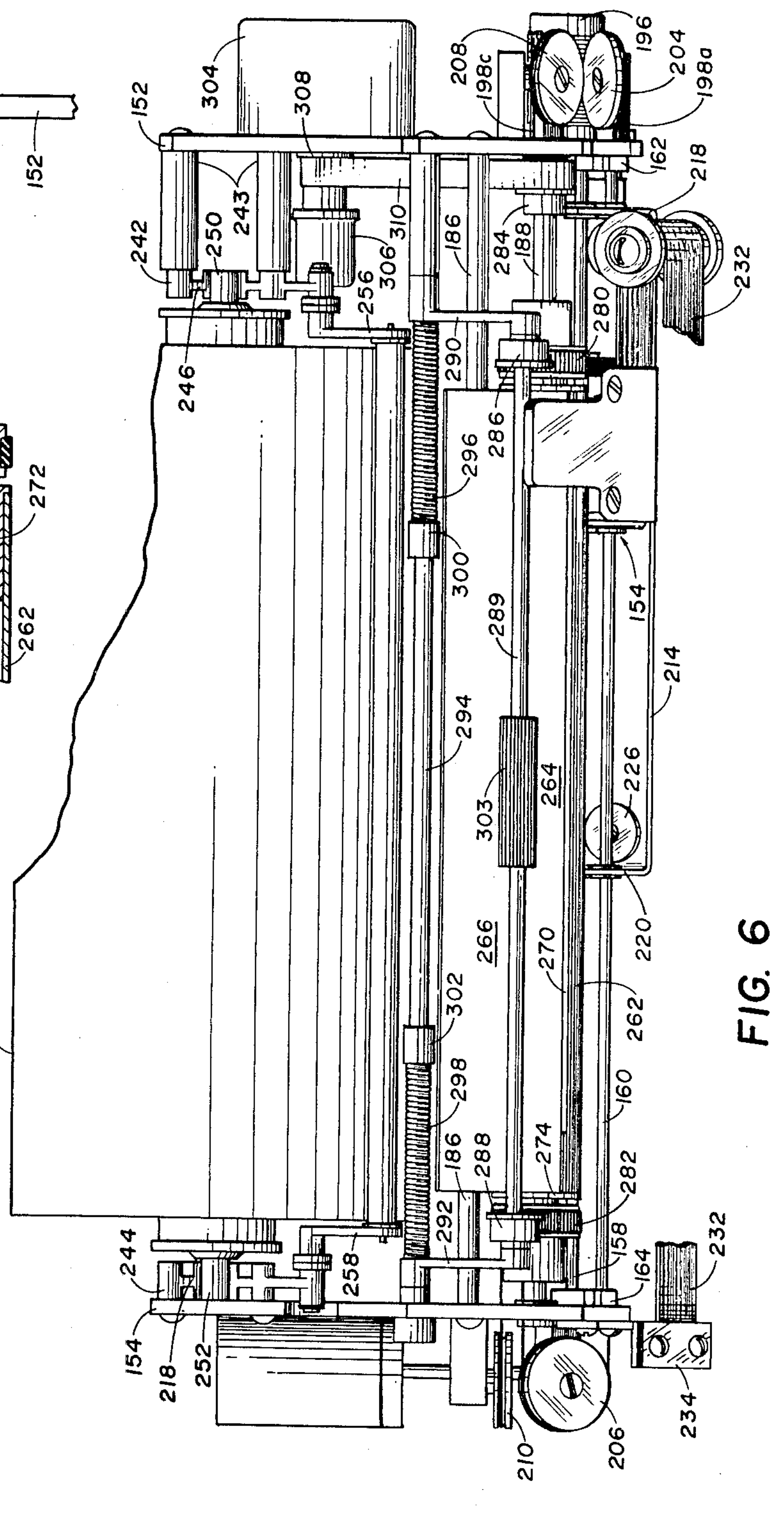
FIG. 6 is a plan view of the electronic printer of FIG. 3.

From FIGS. 4, 6 and 8, it will be noted that the lower shelf 262 and the upper shelf 264 are spaced apart to provide a longitudinally extending groove 270. The pressure pad 192 projects through the groove 270 to a point slightly beyond the cylindrical curvature of the lower and upper shelves 262 and 264, as can best be seen in FIG. 8. The lower and upper shelves 262 and 264 are mounted on a pair of slotted sleeves 272 (see FIG. 7) and 274 which are journaled on the line feed drive shaft 188 by bearings 278. Paper drive rollers 280 and 282 are splined to the drive shaft 188 at each end of the shelves 262 and 264 and have resilient rims with radii very slightly larger than the radii of curvature of the cylindrical shelves 262 and 264. A drive sheave 284 is splined to the shaft 188. Shaft 188 is rotatably journaled in the right-hand and left-hand uprights 152 and 154. A pair of idler rollers 286 and 288 are journaled on a shaft 289 which extends between the ends of arms 290 and 292 which in turn are pivotally mounted on a rod 294 which extends between the right-hand and left-hand uprights 152 and 154. The arms 290 and 292 are connected to helical springs 296 and 298, respectively, which are disposed around the rod 294 and anchored by clamps 300 and 302 so as to continually urge the rollers 286 and 288 toward the respective drive rollers 280 and 282, to clamp the edges of the paper 240 between the idler rollers 286 and 288 and drive rollers. A roller 303 is also journaled on the center of shaft 289 to assist in guiding the paper. A second stepping motor 304 is mounted on the outer face of the right-hand upright support 152 and has a shaft extending leftward into a rotary dash pot 306. A drive sheave 308 is mounted on the housing of the dash pot 306 and drives a toothed belt 310 which passes around sheave 284 on the feed roller shaft 188. Thus, as the motor 304 is stepped as will hereafter be described, the continuous sheet of paper 240 from the roll is advanced, one line at a time, by the rollers 280 and 282.

DESCRIPTION OF ELECTRONIC PRINTER CONTROL CIRCUITRY

Figure 9:
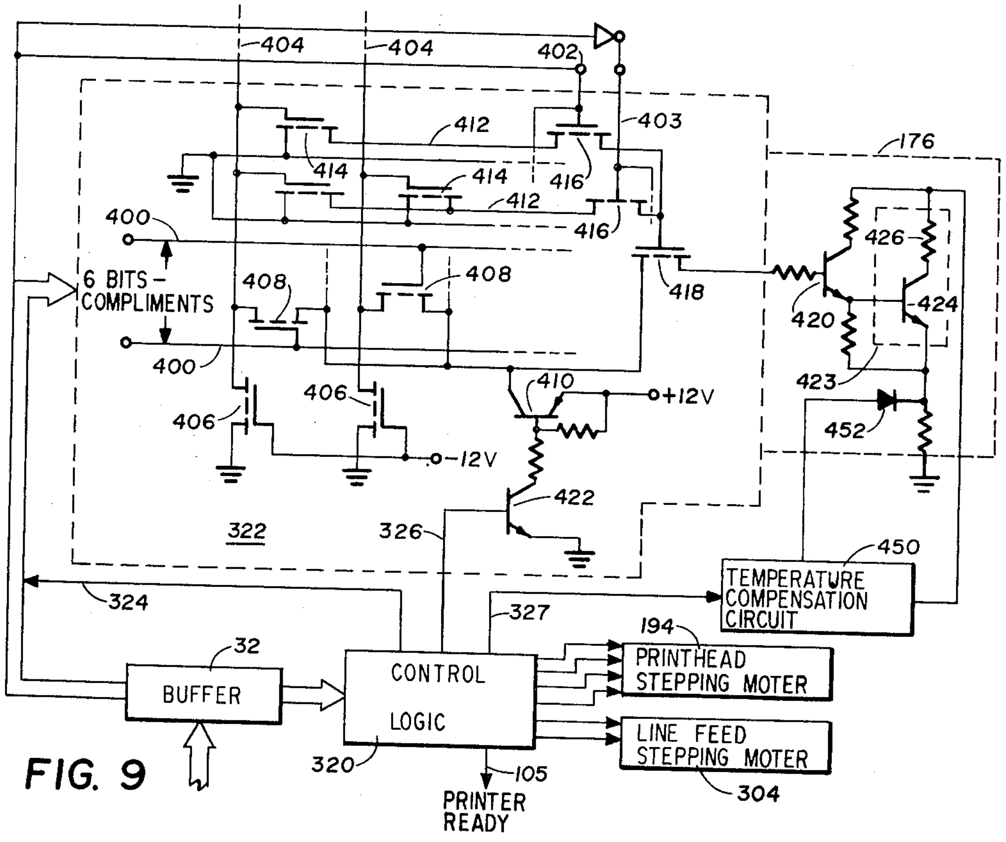
FIG. 9 is a schematic circuit diagram of the electronic controls of the electronic printer.

The circuitry for operating the electronic printer 34 is shown in the schematic block diagram in FIG. 9. The data output from the buffer 32 is fed both to a control logic circuit 320 and to an MOS array character generator circuit 322. The control logic 320 decodes control characters from the data to provide a data bit on line 324 representative of whether an upper case or lower case character (i.e., upshift or downshift) is to be printed. The control logic 320 also prevents operation of the printer if a parity check is not satisfactory, and provides a print and step cycle, a back space cycle, a carriage return and line feed cycle, and a line feed only cycle. During the print and step cycle, the control logic 320 also produces a positive-going print pulse on line 326, a negative-going print pulse on line 327, and a printer not ready signal on line 105. The character generator circuit decodes seven parallel bits, plus complements, to selectively turn the buffer stage 420 and heater element transistor 424 "on" during the print cycle to produce the proper character. A temperature compensation circuit 450 senses the temperature of printhead 176 by means of diode 452 prior to the print cycle, and then sets the supply voltage to the printhead at a level to produce a predetermined temperature during the print cycle.

Figure 10:
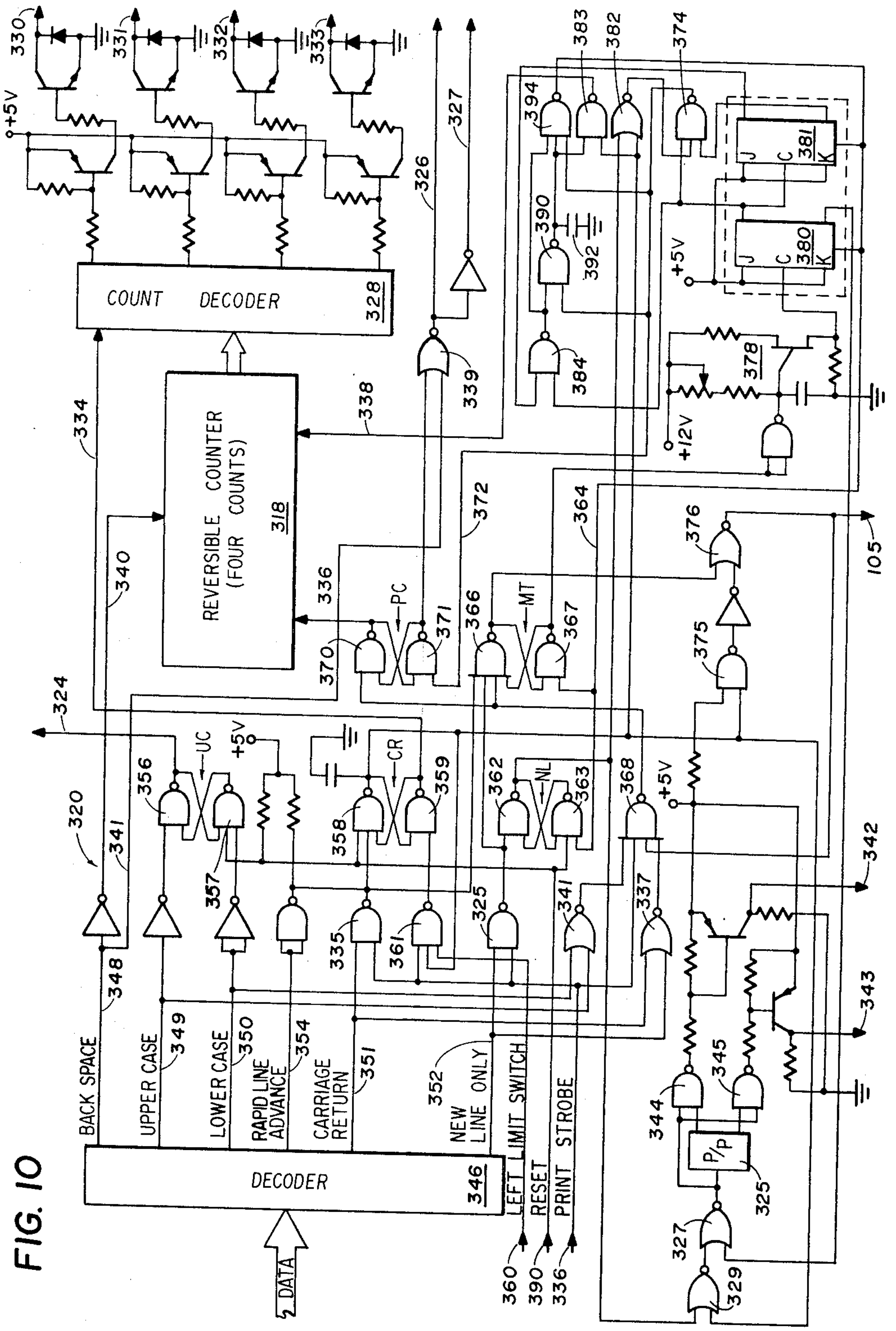
FIG. 10 is a schematic logic diagram of the control logic shown in FIG. 9.

Referring now to the detailed logic diagram of FIG. 10, the printhead carriage stepping motor 194 has four windings, each of which moves the shaft of the motor to a predetermined position when energized. A reversible counter 318 is reset to a count of one when the printhead carriage 156 returns to the left-hand margin by a logic "0" on line 338. The counter is then incremented one count at the end of each print pulse by line 336 going from a logic "1" to a logic "0." A decoder 328 decodes the count of counter 318 and energizes the outputs 330–333 by operating the appropriate transistor switches during counts one through four, respectively, to step the printhead carriage from left to right across the page. One of the outputs 330–333 is always energized so as to maintain the printhead carriage in position against the force of the carriage return spring 236. When a carriage return signal is received on line 334, indicated by a logic "0," the count decoder is disabled so that all power is removed from winding circuits 330–333, thus permitting the motor to be freely driven by the carriage return spring 236 without back EMF. The counter 316 counts in the reverse mode whenever line 340 is at a logic "0" level.

The paper feed stepping motor 304 has two windings which are energized from outputs 342 and 343 which are controlled by the transistor switches operated by the outputs of NAND gates 344 and 345, respectively. Neither of the windings of the paper feed stepping motor 304 is energized except while stepping the motor. However, the motor has a high holding torque when deenergized to hold the paper in position.

The incoming control characters are decoded by the decoder 346 which produces a logic "1" level on the appropriate output line 348–352, respectively, whenever a "back space," "upper case," "lower case," "carriage return" or "new line only" character is received. In addition, the paper is rapidly advanced by repeated carriage return cycles as long as line 354 goes to a logic "1" level on command from the keyboard.

An upper case latch UC comprised of NAND gates 356 and 357 is set to the logic "1" state to produce a logic "1" at the top output 324 whenever upper case line 349 goes to a logic "1" level, and is set to a logic "0" state whenever lower case line 350 goes to a logic "1" level.

A carriage return latch CR comprised of NAND gates 358 and 359 is set to a logic "1" state in response to a logic "1" level on line 351 and a print strobe on line 336, and allows the carriage to return to the left margin position closing a left limit switch which produces a logic "0" on input 360. The carriage return latch CR is reset by the first print strobe after the printhead carriage closes the limit switch.

A new line latch NL comprised of NAND gates 362 and 363 is set to a logic "1" state in response to a logic "1" level on line 352, and a print strobe on line 336, and is reset to a logic "0" state in response to line 364 from NAND gate 394 going to a logic "0" state.

A master timing latch MT comprised of NAND gates 366 and 367 is set to a logic "1" state whenever lines 350, 354, 351 and 352 are at a logic "0" level and a print strobe is gated through gate 368. The master timing latch MT is reset to a logic "0" level in response to the output of NAND gate 394 going to a logic "0" level.

A print cycle latch PC comprised of NAND gates 370 and 371 is set to the logic "1" level whenever the output of NAND gate 368 goes to a logic "0" level in response to a print strobe, and is reset to a logic "0" level whenever line 372, which is the output of NAND gate 374, goes to a logic "0" level.

The logic "1" output from the master timing latch MT and the output from the carriage return latch CR are ORed through NOR gate 376 to disable NAND gate 368 and prevent the passage of a print strobe during either a carriage return cycle or a print cycle. The logic "0" output of the master timing latch MT turns an oscillator circuit 378 "on" to clock a two-stage counter comprised of J-K flip-flops 380 and 381.

During a print cycle, or a back space cycle, signified by the carriage return latch CR and new line latch NL both being in the logic "0" level so that the output of NOR gate 382 is a logic "1," gate 374 produces a logic "0" on line 372 when flip-flop 380 complements to the logic "1" state on the first pulse from oscillator 378. The logic "0" at the output of gate 374 causes the output of gate 390 to go to a logic "1" level which is stored on capacitor 392. Then when flip-flop 380 complements to the logic "0" state on the second pulse from oscillator 378, the output from gate 384 goes back to a logic "1" which results in a logic "0" pulse out from gate 394 to reset the flip-flops 380 and 381 and the master timing latch MT. In the event either carriage return latch CR or new line latch NL is in the logic "1" state, the logic "0" output of NOR gate 382 will disable NAND gate 374, thus preventing the resetting of flip-flops 380 and 381 and master timing latch MT after the second count. Instead, the flip-flops 380 and 381 and master timing latch MT are reset on the fourth count when the outputs of gates 374, 384 and 390 are all at a logic "1" level and the output of gate 394 goes to a logic "0" level.

In the operation of the circuit of FIG. 10, the application of power to the circuit automatically sets upper case latch UC to the lower case mode, resets new line latch NL, resets the print cycle latch PC, and institutes a carriage return cycle by setting carriage return latch CR as a result of applying a logic "0" to reset input 390 by logic circuitry that is not illustrated. When the carriage return latch is set, the logic "0" on line 334 deenergizes the printhead carriage stepping motor so that spring 236 returns the carriage to the left margin and closes the left limit switch, thus applying a logic "1" to the input of the NAND gate 361 to enable the gate to reset the CR latch on the next strobe pulse. The true output of the CR latch also disables gate 368 through the circuit including NAND gate 375 and NOR gate 376. The output of gate 376 also produces a "printer not ready" indication on output 105. The true output of the CR latch also resets the counter 318 to the reference count through NAND gate 383. Then on the next print strobe on line 336, the carriage return latch CR is reset and the system is ready for operation with the printhead carriage at the left-hand margin and the counter 318 at the count of one and the carriage stepping motor 194 energized.

The upper case UC is initially set to the lower case state and this information fed to the character generator. Any time that an upper case character is decoded, latch UC is set to the logic "1" state and all subsequent characters will be upper case until such time as a lower case code is again received. During the presence of either an upper case or a lower case signal the print strobe is blocked from the master timing latch MT at gate 368 through NOR gate 341.

If a line of data is to be printed, the next print strobe received on line 336 is passed through gate 368 to set the master timing latch MT and the print cycle latch PC. The complement output of the print cycle latch is gated out by gate 339 and inverted on line 326 to produce a positive print pulse which results in the energization of the character generator, and a complementary negative pulse on line 327 to operate the temperature compensation circuit to print a character. The true output of the master timing latch MT is gated through NOR gate 376 to disable gate 368 and produce a printer not ready indication on line 105. The complement output of the master timing latch MT sets the oscillator 378 in operation. As soon as the first flip-flop 380 is complemented by the first pulse from the oscillator 378, the output of NAND gate 374 goes to zero, thus resetting the print cycle latch PC. This terminates the print cycle pulse on lines 326 and 327, and increments the counter 326 as line 336 falls to a logic "0." The zero output from gate 374 causes the output from gate 390 to be a logic "1" which is stored on capacitor 392. Then when the output of gate 374 goes back to a logic "1" when flip-flop 381 complements on the next pulse from the oscillator 378, the output of gate 394 goes to a logic "0" which resets flip-flops 380 and 381 and the master timing latch MT, thus terminating the print cycle. Thus, a character has been printed and the printhead carriage stepped one space to the right immediately after the counter 326 was incremented at the end of the print pulse. This procedure is repeated to print characters across the line.

If a back space signal is decoded at any time prior to a print strobe on line 336, the logic "0" level on line 340 causes the counter 318 to be conditioned to count in the reverse mode, while line 341 disables gate 339 so that no output print strobe is produced on lines 326 and 327 during the back space.

In the event a carriage return character is decoded, the gate 368 is disabled through NOR gate 337. Then the next print strobe sets the carriage return latch CR and the master timing latch MT to the logic "1" state through gate 335. When the master timing latch is set at a logic "1" state, the print ready line 105 goes to logic "0" and gate 368 is disabled by gate 376, and oscillator 378 is set in operation. Also, when the carriage return latch CR is set at the logic "1" state, gate 374 is disabled through gate 382 and the output of gate 329 goes to a logic "0," thus enabling gate 327. The complement output of the carriage return latch CR is then at a logic "0" which open circuits all of the windings to the carriage stepping motor 194, thus permitting the spring 236 to return the carriage to the left-hand margin and close the left limit switch. The true output of the CR latch also resets the counter 318 through gate 383. Since gate 374 is disabled, the counter comprised of flip-flops 380 and 381 proceeds to the count of four before being reset by the output of gate 366. As flip-flop 380 goes through the second and fourth counts, the logic "1" level on the complement output of flip-flop 380 complements flip-flop 325. The true output of flip-flop 325 in conjunction with the output of gate 327 is decoded by gates 344 and 345 to cause the paper drive stepping motor 304 to advance two steps, which corresponds to a single line advance of the paper. When the output of gate 394 goes to zero at the count of four, the cycle is ended by resetting flip-flops 380 and 381 and the master timing latch MT. The next print strobe then resets the carriage return latch through gate 361 to complete the carriage return cycle during which the carriage was returned to the left margin, and the paper advanced ready to print a new line.

In the event a new line only character is decoded, gate 368 is again disabled through gate 337. Then on the next print strobe, the new line latch NL and the master timing latch MT are both set as a result of the output of gate 325 going to a logic "0" level. The true output of the new line latch NL then enables gate 327 through gate 329, and disables gate 374 through gate 382. The true output of the master timing latch MT causes the print ready line 105 to go to a logic "0" and disables gate 368, and the complement output sets the oscillator 378 in operation. The flip-flops 380 and 381 again proceed to a count of four before being reset by the output of gate 394, and the paper drive stepping motor is stepped on the counts of two and four as previously described. The logic "0" output from gate 394 resets the mater timing MT and new line NL latches to end the cycle.

The MOS character generator 322 is of the type described in copending U.S. application, Ser. No. 567,459, filed on July 25, 1966, now U.S. Pat. number 3,541,553, entitled "Binary Decoder," and assigned to the assignee of the present invention. The character generator 322 receives a total of seven parallel bits of information including the back space information on line 324 from the control logic 320 and the complement of each. Six bits of the information plus their complements are received on inputs 400 and an additional bit and its complement are input on lines 402 and 403. The twelve inputs 400 are arranged in parallel relationship and extend normal to a number of parallel character output lines 404. There is one output line 404 for each character to be generated, typically 80. Each of the lines 404 is connected to ground through an MOS transistor 406. The gates of MOS transistors 406 are connected to a negative voltage source so that the transistors function as load resistors. The input lines 400 are connected to the gates of input decoding MOS transistors 408. The sources of the input decoding transistors 408 are connectable to a positive voltage source through a bipolar switching transistor 410, and the drains are connected to the character output lines 404. Fifty output lines 412 (two outputs for each element of the electronic printhead) extend normal to the character lines 404. An MOS transistor 414 is provided to connect each of the outputs 412 that is required to generate the character in the matrix represented by the character line 404 to ground. The data inputs 402 control MOS transistors 416, and inputs 403 control MOS transistors 417 so as to select which of a pair of output lines 412 are to be connected to the gate of an MOS output buffer 418 which controls current supplied through bipolar transistor 410 to the base of bipolar transistor 420 used to drive the bipolar transistor 424 which controls current through the heater resistor 426 of each element of the electronic printhead during the print cycle. The MOS circuit 322 is enabled by the print pulse on line 326 from the control logic 320 which turns bipolar transistors 422 and 410 "on" to connect the positive voltage terminal to the sources of MOS transistors 408 and 418.

Thus, during a print cycle when transistor 410 is turned "on," the character lines 404 are normally at a positive potential determined by the values of the load resistances 406 so long as any one of the transistors 408 connected to the particular character line 404 is "on." This results in the transistor 414 controlled by the particular output line 404 being turned "off" and the element controlled by output line 412 being "off." If, however, all of the transistors 408 connecting the positive voltage supply to the particular character line 404 are turned "off," as will be the case only when the particular combination of logic inputs designates the character represented by the particular character line 404, then the output line 404 is at ground potential and all of the output lines 412 necessary to form that character will be connected to ground by an MOS transistor 414. The information on lines 402 finally selects between two differently coded output lines 412 to ultimately turn "on" the output transistor 418 for the particular elements necessary to generate the character. The MOS circuit 322 is an integrated circuit contained in a single package.

Figure 11:
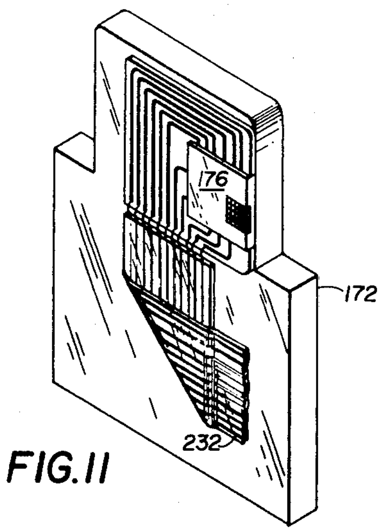
FIG. 11 is an isometric view of the rear face of the printhead and heat sink of the electronic printer of FIG. 3.
Figure 12:
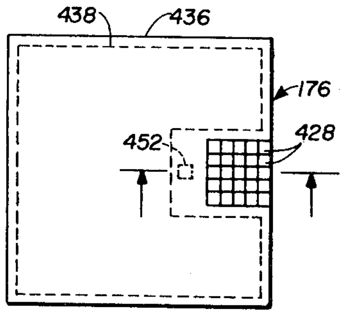
FIG. 12 is an enlarged view of the printhead shown in FIG. 11.
Figure 13:
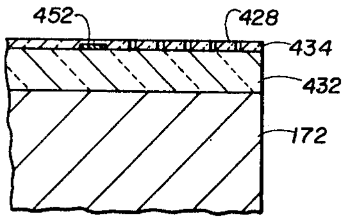
FIG. 13 is a sectional view taken substantially on lines 13—13 of FIG. 12.

Referring now to FIGS. 11–13, the printhead 176 which is mounted upon the heat sink 172 is of the type described and claimed in its various aspects in copending U.S. applications, Ser. No. 650,821, filed July 3, 1967, entitled "Thermal Displays Using Air Isolated Integrated Circuits and Methods of Making Same," and Ser. No. 671,821, filed Sept. 29, 1967, now U.S. Pat. No. 3,501,615, entitled "Integrated Heater Element Array and Drive Matrix and Method of Making Same," and each assigned to the assignee of the present invention. The printhead 176 is comprised of a 5 × 5 matrix of semiconductor mesas 428 which are thermally isolated one from the other by air gaps as best seen in FIG. 13, and which are bonded to a ceramic chip 432 by a thermally insulting epoxy layer 434. The transistor 424 (see FIG. 9) and resistor 426 for each mesa is diffused in the interior face adjacent the epoxy layer. The transistor 420 for each of the 25 mesas is formed in the face of a semiconductor chip 436 generally in the area designated by the dotted outline 438 in FIG. 12 and the circuits completed by thin metallic film leads formed on the surface of the semiconductor mesas 428 and chip 436 adjacent the epoxy layer 434. The ceramic chip 432 is then bonded to the metallic heat sink 172. The leads to the driver circuit for the mesas terminate around the periphery of the semiconductor chip 436 and are bonded to leads formed on a printed circuit template 440 mounted on the heat sink 172. The leads on the printed circuit 440 are soldered to the leads carried by the multilead strap cable 232.

Figure 14:
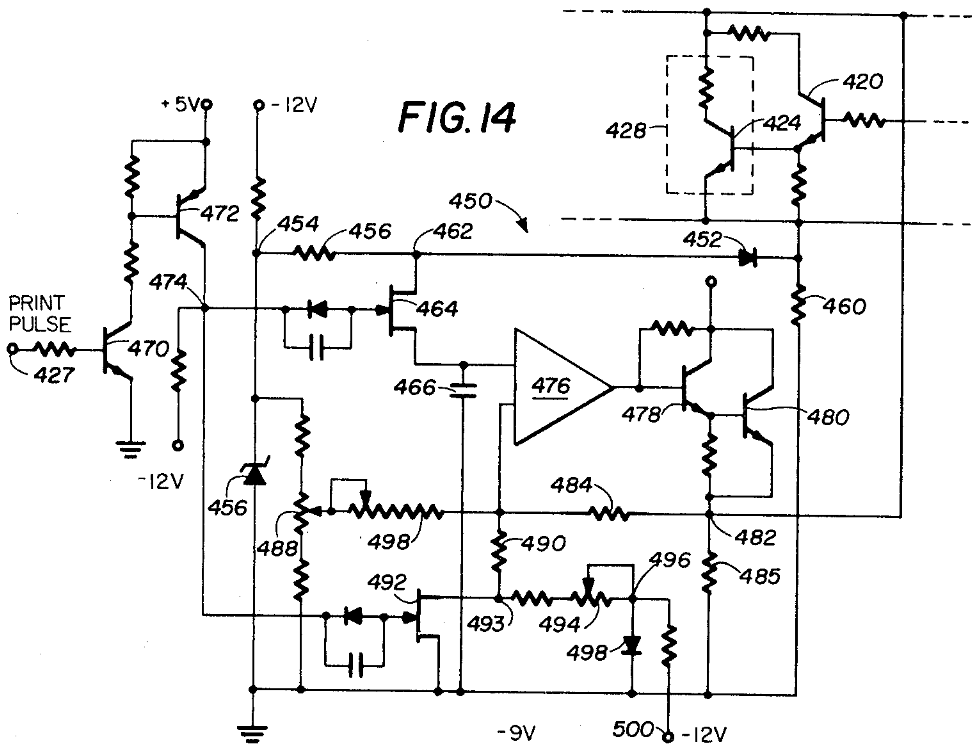
FIG. 14 is a schematic circuit diagram of the temperature compensation circuit of FIG. 9.

Referring now to FIG. 14, the temperature compensation circuit 450 includes a temperature sensing diode 452 which is located on the chip 436 adjacent to the matrix of thermal elements 428 generally in the position indicated in FIGS. 12 and 13. A constant voltage is established at point 454 by a Zener diode 456 so that current flows through resistor 458, the temperature sensing diode 452, and the common return line from all of the transistors 420 and 424 on the printhead 176. The resistance of the common return is represented by resistor 460.

The voltage at point 462 is sampled through switch 464 and stored on capacitor 466 except during each negative going print cycle. Thus, whenever input 327 from the control logic 320 is at a positive voltage level so that transistors 470 and 472 are turned "on" and point 474 is positive, switch 464 is turned "on." Then during the negative going print cycle on line 327, the switch 464 is turned "off."

The voltage on capacitor 466 is applied to the noninverting input of an operational amplifier 476. The output of amplifier 476 is passed through a pair of output stages 478 and 480 to an output 482 which is connected to provide collector current to all of the transistors 420 and 424 of the printhead. Resistor 485 provides a load when all elements of the printhead are turned "off" during a print cycle, such as would be required to produce a space. A feedback resistor 484 connects the output 482 back to the inverting input of amplifier 476. The inverting input is also connected through a variable resistance 486 to the sliding contact of a voltage divider 488 which is connected across the reference Zener 456. The inverting input is also connected through a resistor 490 and a second switch 492 to ground, and alternatively through a variable resistance 494 to a voltage supply of about −9.0 volts at point 496, as established by the Zener diode 498 and the negative voltage at terminal 500. The switch 492 is also controlled by transistors 470 and 472 and thus is turned "off" during the print cycle, and "on" during the sample cycle.

Prior to operation of the temperature compensation circuit 450, the sliding contact of voltage divider 488 is first adjusted so that the voltage at the sliding contact is equal to the voltage at the sample point 462 when the diode 452 is at ambient temperature. This voltage is typically +0.7 volt. Next, the print pulse is activated at a slow rate and variable resistor 494 is adjusted until the output voltage at point 482 is at the level necessary to achieve the desired darkness of print. Next, the print rate is increased to the maximum anticipated rate and variable resistor 486 adjusted to achieve the same print quality, thus producing approximately the same output voltage at 482.

In the operation of the circuit 450, the average temperature of the printhead is sensed by means of the voltage drop across diode 452 prior to each print cycle, and the power applied to the printhead during the print cycle is then adjusted according to the previously sensed temperature. For example, when the printing rate is slow, the offset potential voltage across the diode 452 is approximately 0.7 volt so that 0.7 volt is stored on capacitor 466 during the sampling period when switch 464 is open. Switch 492 is also open during this sampling period so that point 493 is essentially shorted to ground. This configuration results in an output voltage of approximately +3.0 volts at 482 to keep the amplifier from going into saturation, but not sufficiently high to produce printing. In addition, all of the printheads are "off" so that no printing can result. During the print cycle, switches 464 and 492 are closed and at least part of the elements of the printhead will usually be turned "on." Closing sampling switch 464 prevents voltage surges at point 462 due to increased IR drop across resistor 460 and heating of the printhead from being applied to the amplifier 476 with resulting inaccuracies and instabilities. Closing of switch 492 pulls point 493 more negative, requiring a higher voltage at the output 482 to balance the amplifier. However, as the temperature of the diode 452 increases, due to an increase in printing rate or the nature of the characters being printed, or to a lesser extent due to an increase in the ambient temperature, the offset voltage across the diode 452 decreases, thus decreasing the voltage stored on capacitor 466 and applied to the input of amplifier 476 during the print cycle. For example, an increase in the temperature in the printhead of 50° C results in a lowering of the voltage by 0.1 volt to about 0.6 volt. The inverting input is then maintained only at approximately 0.6 volt during the print cycle so that the output voltage at 482 need not be as high as would otherwise be necessary to balance the amplifier 476. The output voltage required to balance the amplifier is further reduced by the current that then passes through resistor 486, which compensates for the increased cooling rate at higher printhead temperatures.

Although a preferred embodiment of the invention has been described in detail, it is to be understood that various changes, substitutions, and alterations can be made therein without departing from the spirit and scope of the invention as defined by the appended claims.

What is claimed is:

1. In an electronic device for printing on a sheet of recording medium, the combination of:

support means for supporting the sheet of recording medium, carriage means, an electronic printhead mounted on the carriage means, guide means for guiding the carriage means such that the printhead is movable past a plurality of printing positions on the sheet of recording medium, a motor having a plurality of windings each positioned to rotate the shaft of the motor to a predetermined angular position when energized and coupled to move the carriage means along the guide means as the windings are successively energized, counter means for counting a logic clocking signal, first logic means for energizing the windings of the motor in a sequence determined by the count of the counter, said first logic means including means for open circuiting all of the motor windings in response to a return carriage logic signal, spring means for returning the carriage means to a reference position when the motor windings are open circuited, and second logic means for, in response to a print strobe, first producing a print signal for operating the electronic printhead to print a character and then clocking the counter to energize the next successive winding of the motor and advance the carriage.

2. The combination defined in claim 1 wherein:

the counter has a logically controllable count-in-reverse mode, and further characterized by third logic means for, in response to a back space logic signal, applying a logic signal to cause the counter to operate in the count-in-reverse mode and for disabling the second logic means from producing a print signal.

3. The combination defined in claim 1 wherein:

the support means includes means for advancing the sheet of recording medium, and further characterized by a second motor having a plurality of windings each positioned to rotate the shaft of the motor to a predetermined angular position when energized, the second motor being coupled to drive the means for advancing the sheet of recording medium, and third logic means for energizing the windings of the second motor in a predetermined sequence to advance the sheet of recording medium one line in response to a carriage return logic signal or a new line logic signal.

4. The combination defined by claim 1 wherein said electronic printhead comprises a thermal printing matrix bonded to said carriage means, said carriage means having a heat sink portion for the dissipation of heat from said thermal printing matrix.

5. The combination defined by claim 1 further comprising third logic means responsive to an upper case signal or lower case signal for applying to a character generator a signal indicative of the case of characters to be generated.

6. The combination defined by claim 1 further comprising second carriage means having a pressure pad mounted thereon which establishes mating contact with the electronic printhead, said second carriage means being movably mounted on a second guide means and coupled to said motor to be moved along the second guide means as the electronic printhead carriage means is moved.

* * * * *